Patented Jan. 22, 1946

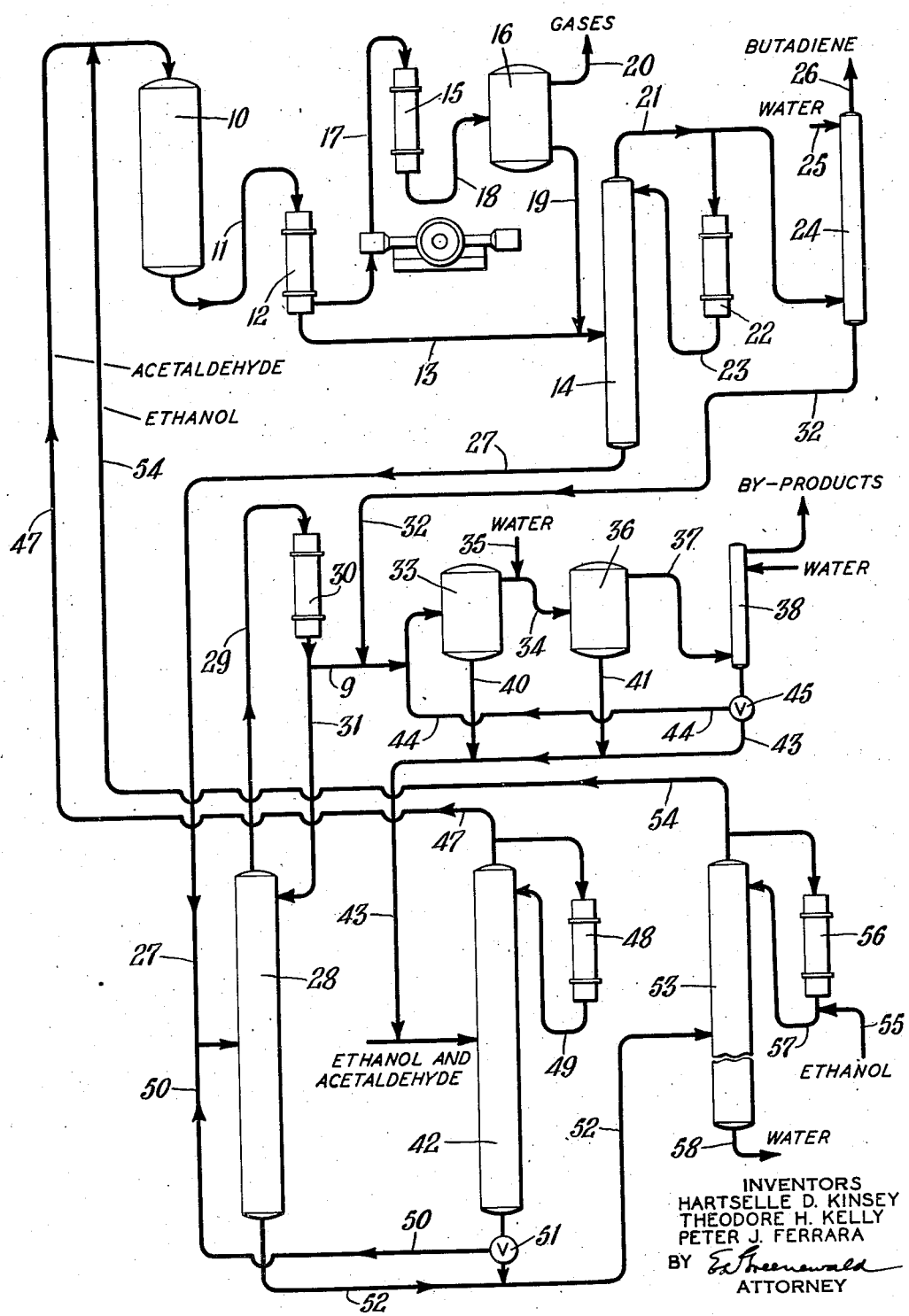

2,393,381

UNITED STATES PATENT OFFICE 2,393,381

CYCLIC PROCESS FOR MAKING BUTADIENE

Hartselle D. Kinsey, Whiting, Ind., and Theodore H. Kelly and Peter J. Ferrara, Charleston, W. Va., assignors to Carbide and Carbon Chemicals Corporation, a corporation of New York Application April 27, 1944, Serial No. 532,980

11 Claims. (Cl. 260—681)

This invention pertains to a cyclic process for producing butadiene from a mixture of ethanol and acetaldehyde, and to an improved method for separating unreacted acetaldehyde in such a process for recycling.

The reaction of ethanol with acetaldehyde to produce butadiene has been investigated academically for many years, and the recent development of improved catalysts for this reaction has enabled the process to be operated commercially. In the present state of the art, however, the known catalysts are not completely selective, and they also exert a secondary action on the ethanol and acetaldehyde to convert them to side reaction products. The principal side reaction which occurs is the dehydration of ethanol to diethyl ether, although other ethers, esters, ketones, liquid hydrocarbons and higher aldehydes are also produced as the result of more complex side reactions.

The effluent materials from the butadiene converter contain butadiene, ethanol, acetaldehyde, water, hydrocarbon gases, and the side reaction products discussed above (hereinafter collectively termed "by-products"). Satisfactory methods have been developed for recovering butadiene from the condensible reaction products by condensation and distillation, and the butadiene present in the hydrocarbon gases may be recovered by scrubbing the gases with a solvent for the butadiene, and removing the butadiene from the solvent. However, the recovery of acetaldehyde of satisfactory purity from the liquid reaction products, and the removal of by-products has proven difficult.

When the remainder of the reaction mixture, after expulsion of the butadiene and gases, was introduced into a fractionating column of the continuous type, intended for the removal of acetaldehyde, which was the most volatile constituent present in any quantity, considerable difficulties were encountered. Not only did the acetaldehyde form azeotropes (constant boiling mixtures non-separable by distillation because the vapors given off from the liquid have the same composition as the liquid) with the diethyl ether and other constituents of the by-products, which necessitated the recycling of such by-products in the quantities fixed by the azeotropic compositions, but the composition of such distillate was not uniform. It was found that the by-products appear in the distillate in even greater quantities than called for by the azeotropic composition at fractionating temperatures designed to separate acetaldehyde from ethanol and water.

When such by-products are recycled in large amounts, they cause a decrease in the production of butadiene through dilution of the reactants. Furthermore, when recycled in large quantities, the by-products may react with ethanol or acetaldehyde, which reduces the chemical efficiency of the process. Finally, in these quantities, some of the by-products exert a harmful action on the catalyst, reducing its effectiveness by depositing carbonaceous material thereon, necessitating frequent reactivations of the catalyst and reducing its availability for butadiene production.

The azeotrope of acetaldehyde with diethyl ether boils at 57° C. at 40 p. s. i. gauge, and contains about 75% acetaldehyde by weight at these conditions. However, special method must be adopted to remove such azeotrope continuously from the column, since it cannot be generated in a column for recovering acetaldehyde from the reaction products of the butadiene converter, after separation of the butadiene, when the base temperature is sufficiently high, about 120° C. at a pressure of 40 p. s. i. gauge, to volatilize all the acetaldehyde from the base of the column. Under such conditions the by-products, including additional diethyl ether, tend to distill over with the acetaldehyde-diethyl ether azeotrope in such quantities that the concentration of acetaldehyde in the distillate from the column has been reduced at times to less than 50% by weight. In part, this may be caused by a steam distillation of the by-products, because of their insolubility in the mixture of water and ethanol at the base of the column. When the concentration of acetaldehyde was reduced, as indicated above, the by-products accumulated in the system to such an extent that it became necessary, at times, to purge the system by removing from the cycle large amounts of unreacted ethanol and acetaldehyde until the purge of by-products was effected.

By means of this invention, however, an acetaldehyde distillate of high purity may be recovered from the products of the reaction producing butadiene. The purity of this distillate exceeds the azeotropic composition, and the concentration of acetaldehyde in the distillate may exceed 85% and may be as high as 90 to 95% by weight. Accordingly, the recirculation of by-products through the system in large quantities with the recovered acetaldehyde is avoided.

These desirable results are accomplished by distilling the remainder of the reaction products from the butadiene converter, after expulsion of the butadiene, under such conditions as to remove substantially all the acetaldehyde, and a large fraction of the by-products as a distillate. This distillate is a complex mixture of acetaldehyde with diethyl ether, methyl ethyl ether, ethyl acetate, higher aldehydes and other by-products. Some ethanol is also present in the distillate, but it is desirable to maintain a head temperature such that ethanol is prevented from passing over with this distillate in large quantities. If the composition of this distillate is controlled in this manner, it has been found practicable to separate a large part of the water-insoluble by-products from the acetaldehyde and other water-soluble components by washing with water. Substantially complete recovery of acetaldehyde from the distillate may be achieved by relatively few washings, and the by-products layer discharged from the washing operation contains only negligible amounts of acetaldehyde and ethanol; despite the fact that substantially all the unreacted acetaldehyde from the butadiene reaction is subjected to the washing operation.

When the washing operation is conducted so as to recover substantially all the acetaldehyde, all the by-products in the system are not removed as the water-insoluble layer discharged from the washing operation, but sufficient amounts are removed to accomplish highly valuable objectives. In the first place, sufficient by-products are removed to prevent their accumulation in the cyclic system. In the second place, the concentration of by-products in the column intended for removal of acetaldehyde is reduced to a quantity less than that required for the continuous development of the azeotropes of acetaldehyde with the by-products. Thus, at no place in the column are conditions reached where the vapor is in equilibrium with a liquid having the composition of the azeotrope. Thus, acetaldehyde vapors containing more acetaldehyde than would be fixed by the azeotropic compositions are generated from the column, and, in continuous operation, an acetaldehyde distillate containing about 90% acetaldehyde by weight has been removed continuously from the column for recycling over the butadiene catalyst.

The residue from the distillation to separate acetaldehyde may be returned to the preceding column, in which by-products are removed, for additional separation of by-products, or it may be passed directly to a still for recovering ethanol. The residue from the by-product still passes to a still for recovering ethanol.

In washing the distillate containing the acetaldehyde and by-products, the use of a minimum amount of water will avoid handling increased quantities of water in the subsequent ethanol still and will avoid the solution of large quantities of the by-products in the mixture of water, acetaldehyde and ethanol. The use of larger amounts of water will effect a greater recovery of acetaldehyde. Thus, the amount of water to be employed is usually determined by a compromise between the percentage recovery of acetaldehyde desired and the amount of by-products to be removed. The quantity of water to be used is also affected somewhat by the nature of the by-product mixture to be washed.

When acetaldehyde composes about half the distillate by weight which is to be washed, it is suitable to use, in general, from 0.5 to 2.0 volumes of water per volume of distillate. When the ratio of water to distillate of such acetaldehyde concentration is about 0.65 by volume, the ratio of the bottom aqueous layer to the top oil layer is about 4.4 by volume, and the concentration by weight of acetaldehyde in the oil and aqueous layers is in the ratio of 1.33 to 1.0 at 45° C. At 30° to 35° C., the ratio is approximately unity, so that the washing is more effective at lower temperatures. Washing at lower temperatures requires means to remove the heat evolved by the solution of acetaldehyde in water, in order to maintain the desired temperature. Also, it is frequently desirable to use as the washing liquid, discharged aqueous scrubbing liquid from scrubbers elsewhere in the system designed to recover acetaldehyde from butadiene and vent gases. Such scrubbing liquid may contain from 1 to 2% acetaldehyde by weight, and it is frequently somewhat heated. Substantially all the acetaldehyde may be recovered from the top layer in not more than two to three additional washings.

The nature of the cyclic process, and suitable conditions under which it may be practiced, may be illustrated with reference to the drawing.

Ethanol and acetaldehyde vapors, for example in the molar ratio of about 3 to 1, respectively, are passed to a converter 10, which contains a catalyst of an appropriate type at a temperature of about 300° to 350° C. Suitable catalysts are described in United States application Serial No. 460,120 filed September 29, 1942, by W. J. Toussaint and J. T. Dunn. Part of the ethanol and acetaldehyde is converted to butadiene in the presence of the catalyst, and the effluent vapors pass through pipe 11 to a condenser 12, where the less volatile constituents are liquefied, and withdrawn through pipe 13 to distillation column 14, to recover the condensed butadiene. The gases leaving the condenser are compressed to a pressure of about 55 p. s. i. gauge, and pass through a condenser 15 and a separation tank 16 through pipes 17 and 18 respectively. More of the components, including additional amounts of butadiene, are liquefied by this process and pass through pipe 19 to distillation column 14. The uncondensed gases are withdrawn through pipe 20, and butadiene and acetaldehyde may be recovered from such gases by scrubbing them with a solvent, such as ethanol.

From the distillation column 14, on which is maintained a head temperature of about 47° C. at 65 p. s. i. gauge, butadiene vapor of about 90% purity and containing about 5% acetaldehyde by weight is removed through pipe 21. Part of the butadiene is condensed in condenser 22, and returned through pipe 23, as reflux for the column. The remainder of the butadiene passes to a scrubbing tower 24, wherein acetaldehyde is separated from the butadiene by scrubbing with water introduced through pipe 25. Butadiene of about 95% purity is removed through pipe 26 for further purification.

The residue from column 14, containing acetaldehyde, ethanol, water, diethyl ether and other by-products passes through pipe 27 to distillation column 28. This column is operated under such conditions as to remove substantially all the acetaldehyde in the feed, together with a large fraction of the by-products. A typical analysis of the overhead vapor from such column is as follows:

Specific gravity_____ 0.800 20°/20° C.

| Component | Amount |
|---|---|
| | Per cent by weight |
| Acetaldehyde | 53.0 |
| Ethers (all compounds boiling below 40° C. exclusive of acetaldehyde) | 16.0 |
| Ethyl acetate | 7.0 |
| Ethanol | 13.0 |
| "Oils"—complex mixtures | 6.5 |
| Water | 2.0 |
| Higher aldehydes | 2.5 |
| | 100.0 |

The ethanol content of such vapor is kept low by maintaining a head temperature of 68° to 72° C. under a pressure of 22 to 23 p. s. i. gauge and a reflux ratio of 2.5 to 1. Higher reflux ratios may be employed for this purpose, the upper value being fixed by the permissible downflow in the column. The acetaldehyde distills as a complex mixture, including azeotropes, with diethyl ether and other by-products, as indicated above, and the distillate is removed through pipe 29 to condenser 30, where the distillate is liquefied. Part of the distillate is then returned through pipe 31 as reflux to column 28, and part is subjected to a washing operation to remove sufficient by-products to prevent the formation of azeotropic compositions in the column which recycles acetaldehyde vapor to the butadiene converter and to permit the recovery of acetaldehyde of satisfactory purity by distillation. For this purpose the condensate is mixed in pipe 9 with the scrubber liquid from the scrubber 24 and pipe 32 which contains about 1 to 2% acetaldehyde by weight, and passes to a tank 33, where the mixture separates into an upper and lower layer. The use of the aqueous scrubber liquid to effect separation of the mixture is not essential, but affords economy in the heat required in subsequent distillations. When the volume ratio of water to distillate is 0.65, the ratio of lower layer to upper layer is 4.3 by volume, and the concentrations by weight of acetaldehyde in the lower layer is 30%, and 40% in the upper layer. The upper layer is washed again with one-half its volume of water introduced through pipe 35 to pipe 34, and separated into layers in tank 36. The ratio of bottom layer to top layer is 1.27 by volume, and the respective concentrations of acetaldehyde in the top and bottom layers are 30% and 22% by weight. Tanks 33 and 36 should be constructed to withstand at least a pressure of 20 p. s. i. gauge at 45° C. The top layer from tank 36 passes through pipe 37 to an extractor 38 containing a suitable packing, where it is continuously washed with about an equal volume of water to extract acetaldehyde. The ratio of the lower aqueous layer to the upper by-product layer is 2.1 by volume, and the aldehyde concentrations are 20% in the aqueous layer by weight and 4% in the by-product layer. The gross recovery of acetaldehyde is about 99.5%, and less acetaldehyde is discarded from the system by means of this process than when an attempt is made to separate the by-products by fractionation and subsequent batch distillations, because of azeotropes which form.

The lower layers from tanks 33 and 36 pass through pipes 40 and 41 respectively to column 42, intended for removal of acetaldehyde. The aqueous phase from the extractor 38 may pass through pipe 43 to the same distillation column, or it may be recirculated through the washing operation by means of pipe 44 and by-pass valve 45.

In a large scale operation the following data have been obtained on the washing operation described, the quantities being expressed in pounds per hour:

| | First wash | | | |
|---|---|---|---|---|
| | Distillate | Wash liquor | Bottom layer #1 | Top layer #1 |
| Acetaldehyde | 8,310 | 400 | 7,075 | 1,635 |
| Higher aldehydes | 366 | | 206 | 160 |
| Diethyl ether | 2,450 | | 550 | 1,900 |
| Ethyl acetate | 1,540 | | 845 | 695 |
| Ethanol | 1,460 | | 1,306 | 154 |
| Water | 290 | 19,600 | 19,644 | 246 |
| "Oils" | 804 | | 124 | 680 |
| | 15,220 | 20,000 | 29,750 | 5,470 |

Aldehyde recovery, gross, 80.7%.

| | Second wash | | | |
|---|---|---|---|---|
| | Top layer #1 | Wash liquor | Bottom layer #2 | Top layer #2 |
| Acetaldehyde | 1,635 | 30 | 1,423 | 242 |
| Higher aldehydes | 160 | | 53 | 107 |
| Diethyl ether | 1,900 | | 703 | 1,197 |
| Ethyl acetate | 695 | | 333 | 362 |
| Ethanol | 154 | | 124 | 30 |
| Water | 246 | 7,470 | 7,652 | 64 |
| "Oils" | 680 | | 132 | 548 |
| | 5,470 | 7,500 | 10,420 | 2,550 |

Aldehyde recovery in two washes, gross, 96.5%.

| | Third wash (extraction) | | | |
|---|---|---|---|---|
| | Top layer #2 | Wash liquor | Bottom layer #3 | Top layer #3 |
| Acetaldehyde | 242 | 50 | 255 | 37 |
| Higher aldehydes | 107 | | 41 | 66 |
| Diethyl ether | 1,197 | | 232 | 965 |
| Ethyl acetate | 362 | | 70 | 292 |
| Ethanol | 30 | | 11 | 19 |
| Water | 64 | 2,575 | 2,630 | 9 |
| "Oils" | 548 | | 6 | 542 |
| | 2,550 | 2,625 | 3,245 | 1,930 |

Aldehyde recovery in three washes, gross, 99.3%.

Instead of the batch washing process described, a continuous extractor may be employed to separate the acetaldehyde from the by-products. The following data have been obtained in an extractor 14 inches in diameter, 20 feet high and having the middle 15 feet packed with 1½ inch porcelain rings.

| Continuous phase | Water | Distillate |
|---|---|---|
| Distillate rate, lb./hr. | 1,790 | 1,730 |
| Water, lb./hr. | 2,330 | 2,330 |
| Top layer, lb./hr. | 202 | 130 |
| Bottom layer, lb./hr. | 3,918 | 3,930 |
| Per cent acetaldehyde in distillate | 45.0 | 52.0 |
| Per cent acetaldehyde in top layer | 10.5 | 6.5 |
| Per cent acetaldehyde in bottom layer | 20.0 | 22.7 |
| Per cent recovery of acetaldehyde | 97.5 | 99.1 |

In this particular embodiment of the invention, the fractionating column 42 also separates acetaldehyde, ethanol, water and impurities from a mixture formed by the dehydrogenation of ethanol over suitable catalysts, and the recovery of acetaldehyde from the hydrogen by washing with water according to well-known methods.

However, the major by-products, including diethyl ether, are formed in the butadiene reaction so that the principles of the invention are the same, irrespective of the source of the acetaldehyde consumed in the process. Thus, the composite feed to the column 42 may contain:

|  | Per cent by weight |
| --- | --- |
| Acetaldehyde | 21.1 |
| Ethanol | 6.5 |
| By-products | 5.1 |
| Water | 67.3 |
|  | 100.0 |

The column may be operated at a head temperature of 57° to 58° C. at a pressure of 40 p. s. i. gauge and a reflux ratio of 1.5 to 1. Because of the elimination of substantial amounts of the by-products by means of the azeotropic distillation and washing step described, the concentration of by-products in the column may be regulated so that acetaldehyde vapor of 90 to 95% purity by weight may be removed from the top of the column. This vapor is led through pipe 47 for passage through the butadiene converter. Part of the vapor is condensed in condenser 48 and returned as reflux through pipe 49. Should acetaldehyde be obtained from a source other than ethanol, as from acetylene, the acetaldehyde consumed in the process may be added as reflux in the column.

The residue from the acetaldehyde still 42 may be recycled to column 28 through pipe 50 for further removal of by-products, or, by means of valve 51 and pipe 52, it may be passed directly to a column 53 for recovering ethanol. The residue from the by-products column 28 also passes through pipe 52 to the ethanol still 53. Typical compositions of such residues are as follows, when both residues are passed directly to column 53.

|  | Acetaldehyde still residue | By-product still residue |
| --- | --- | --- |
|  | Percent by weight | Percent by weight |
| Ethanol | 8.4 | 77.0 |
| Acetaldehyde | 0.4 | 0.9 |
| By-products | 3.8 | 2.5 |
| Water | 87.4 | 19.6 |
|  | 100.0 | 100.0 |

The ethanol still may operate at a pressure of 50 p. s. i., and a head temperature of 120° C. and ethanol vapor is passed through pipe 54 to the butadiene converter. Where the butadiene reaction is operated in conjunction with a process for producing acetaldehyde from ethanol, part of the recovered ethanol is recycled to produce additional acetaldehyde. In any event, ethanol consumed in the process may be added through pipe 55 as part of the reflux required in the ethanol column, as described in United States Patent No. 2,249,847 to I. L. Murray. Additional reflux may be supplied by condensing part of the overhead vapor in condenser 56, and returning the condensate to the column through pipe 57. Water is discharged from the column through pipe 58, and its heat content may be recovered by suitable heat exchange in the system.

By means of the invention described, it has proved possible to remove the by-products as they are formed in the reaction of acetaldehyde with ethanol, and to prevent their accumulation in the cyclic system by being returned with the acetaldehyde distillate. This reduction of recirculated impurities has led to an increased production of butadiene and has avoided a source of catalyst contamination. A minimum amount of ethanol and acetaldehyde is discarded with the by-products, which increases the chemical efficiency of the process for making butadiene.

We claim:

1. In a cyclic process for making butadiene which comprises passing acetaldehyde and ethanol over a catalyst to form a mixture including butadiene, unreacted acetaldehyde, and by-products, the steps of removing butadiene from said mixture and distilling the mixture, after expulsion of the butadiene, to remove a distillate containing acetaldehyde and by-products, mixing said distillate with water to partition it between two immiscible phases of different specific gravities, distilling the phase having the higher specific gravity to remove a fraction containing a higher concentration of acetaldehyde than said distillate, and recycling this fraction over the catalyst.

2. In a cyclic process for making butadiene which comprises passing acetaldehyde and ethanol over a catalyst to form a mixture including butadiene, unreacted acetaldehyde, and by-products, the steps of removing butadiene from said mixture and distilling the mixture, after expulsion of the butadiene, to remove a distillate containing substantially all the acetaldehyde and a large portion of the by-products present in said mixture, mixing said distillate with water to partition it between two immiscible phases of different specific gravities, distilling the phase having the higher specific gravity to remove a fraction containing a higher concentration of acetaldehyde than said distillate, and recycling this fraction over the catalyst.

3. In a cyclic process for making butadiene which comprises passing acetaldehyde and ethanol over a catalyst to form a mixture including butadiene, unreacted acetaldehyde, and by-products, the steps of removing butadiene from said mixture and distilling the mixture, after expulsion of the butadiene, to remove a distillate containing acetaldehyde and by-products, mixing said distillate with water in separate increments to partition it between two immiscible phases of different specific gravities, distilling the phase having the higher specific gravity to remove a fraction containing a higher concentration of acetaldehyde than said distillate, and recycling this fraction over the catalyst.

4. In a cyclic process for making butadiene which comprises passing acetaldehyde and ethanol over a catalyst to form a mixture including butadiene, unreacted acetaldehyde, and by-products, the steps of removing butadiene from said mixture and distilling the mixture, after expulsion of the butadiene, to remove a distillate containing acetaldehyde and by-products, countercurrently extracting said distillate with water to partition it between two immiscible phases of different specific gravities, distilling the phase having the higher specific gravity to remove a fraction containing a higher concentration of acetaldehyde than said distillate, and recycling this fraction over the catalyst.

5. In a cyclic process for making butadiene which comprises passing acetaldehyde and ethanol over a catalyst to form a mixture including butadiene, acetaldehyde, ethanol, diethyl ether and other by-products, the steps of removing butadiene from said mixture and distilling the mixture, after expulsion of butadiene, to remove a distillate containing a moderately high percentage of acetaldehyde and lesser amounts of by-products and ethanol, mixing said distillate with water in successive steps to separate it into water-miscible components and water-immiscible components, distilling the water-miscible components to remove a fraction having a higher concentration of acetaldehyde than said distillate, and recycling this fraction over the catalyst.

6. In a cyclic process for making butadiene which comprises passing acetaldehyde and ethanol over a catalyst to form a mixture including butadiene, unreacted acetaldehyde, and by-products, the steps of removing butadiene from said mixture and distilling the mixture, after expulsion of the butadiene, to remove a distillate containing acetaldehyde and by-products, mixing said distillate with water to partition it between two immiscible phases of different specific gravities, distilling the phase having the higher specific gravity to remove a fraction containing a higher concentration of acetaldehyde than the azeotrope of acetaldehyde and by-products, and recycling this fraction over the catalyst.

7. In a cyclic process for making butadiene which comprises passing acetaldehyde and ethanol over a catalyst to form a mixture including butadiene, unreacted acetaldehyde, and by-products, the steps of removing butadiene from said mixture and distilling the mixture, after expulsion of the butadiene, to remove a distillate containing substantially all the acetaldehyde and a large portion of the by-products present in said mixture, mixing said distillate with water to partition it between two immiscible phases of different specific gravities, distilling the phase having the higher specific gravity to remove a fraction containing at least about 85% acetaldehyde by weight and recycling this fraction over the catalyst.

8. In a cyclic process for making butadiene which comprises passing acetaldehyde and ethanol over a catalyst to form a mixture including butadiene, unreacted acetaldehyde, and by-products, the steps of removing butadiene from said mixture and distilling the mixture, after expulsion of the butadiene, to remove a distillate containing acetaldehyde and by-products, mixing said distillate with water to partition it between two immiscible phases of different specific gravities, distilling the phase having the higher specific gravity to remove a fraction containing a higher concentration of acetaldehyde than said distillate, recycling this fraction over the catalyst, and returning the residue from this last distillation to the previous distillation.

9. In a cyclic process for making butadiene which comprises passing acetaldehyde and ethanol over a catalyst to form a mixture including butadiene, acetaldehyde, ethanol, and by-products, the steps of removing butadiene from said mixture and distilling the mixture, after expulsion of the butadiene, to remove a distillate containing acetaldehyde and by-products, mixing said distillate with water to partition it between two immiscible phases of different specific gravities, distilling the phase having the higher specific gravity to remove a fraction containing a higher concentration of acetaldehyde than said distillate, recycling this fraction over the catalyst, and separating ethanol from the residues of the two previous distillations and recycling the separated ethanol over the catalyst.

10. In a cyclic process for making butadiene which comprises passing acetaldehyde and ethanol over a catalyst to form a mixture including butadiene, acetaldehyde, ethanol, and by-products, the steps of heating such mixture to expel butadiene vapors and a portion of the acetaldehyde, washing said vapors with water to form a dilute aqueous solution of acetaldehyde, distilling the remainder of said mixture, after expulsion of butadiene, to remove a distillate containing acetaldehyde and by-products, mixing said distillate with said aqueous solution to partition the distillate between two immiscible phases of different specific gravities, distilling the phase having the higher specific gravity to remove a fraction containing a higher concentration of acetaldehyde than said distillate and recycling the fraction over the catalyst.

11. In a cyclic process for making butadiene which comprises passing acetaldehyde and ethanol over a catalyst to form a mixture including butadiene, acetaldehyde, ethanol, and by-products, the steps of heating such mixture to expel butadiene vapors and a portion of the acetaldehyde, washing said vapors with water to form a dilute aqueous solution of acetaldehyde, distilling the remainder of said mixture, after expulsion of butadiene, to remove a distillate containing acetaldehyde and by-products, mixing said distillate with said aqueous solution to partition the distillate between an aqueous layer and a non-aqueous layer, mixing the non-aqueous layer with water to distribute it between a second aqueous layer and a second non-aqueous layer, and distilling the two aqueous layers to remove a fraction containing a higher concentration of acetaldehyde than said distillate and recycling the fraction over the catalyst.

HARTSELLE D. KINSEY.
THEODORE H. KELLY.
PETER J. FERRARA.